(No Model.) 2 Sheets—Sheet 1.
A. C. PACKER.
CAR COUPLING.
No. 530,795. Patented Dec. 11, 1894.
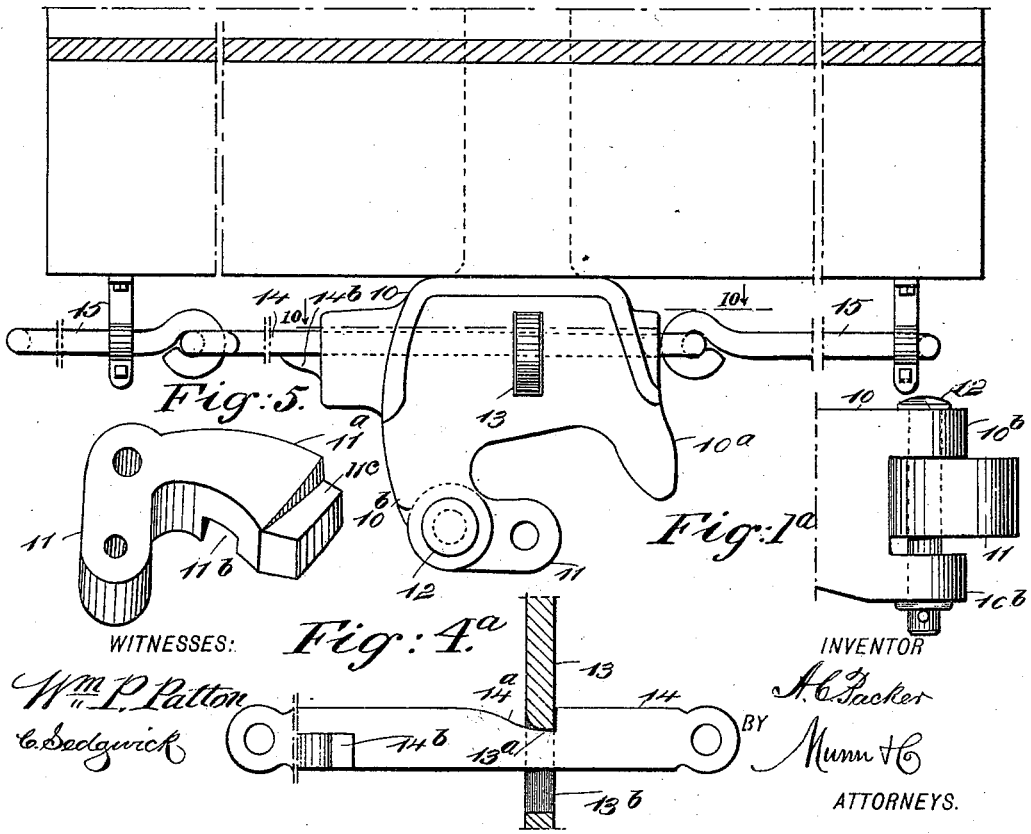
WITNESSES:
Wm. P. Patton
C. Sedgwick
INVENTOR
A. C. Packer
BY Munn & Co
ATTORNEYS.

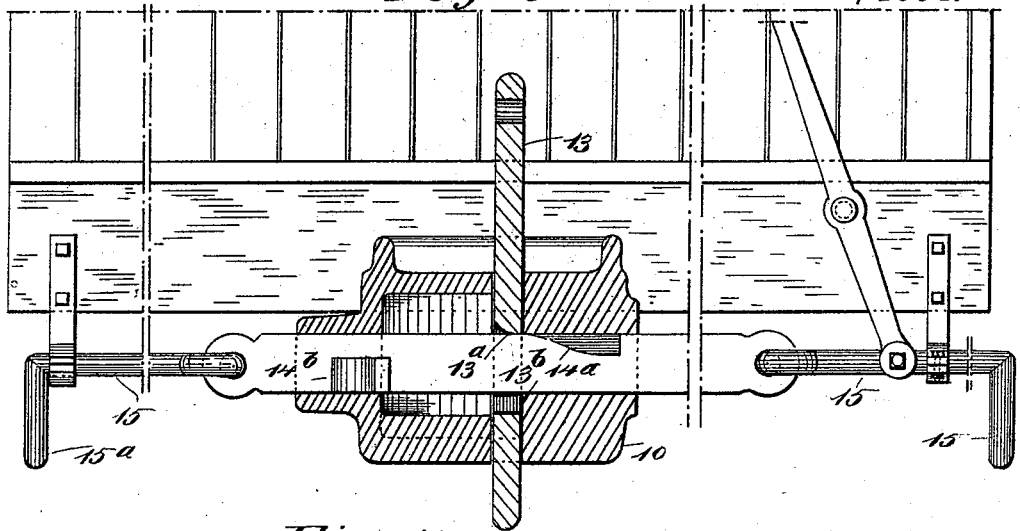
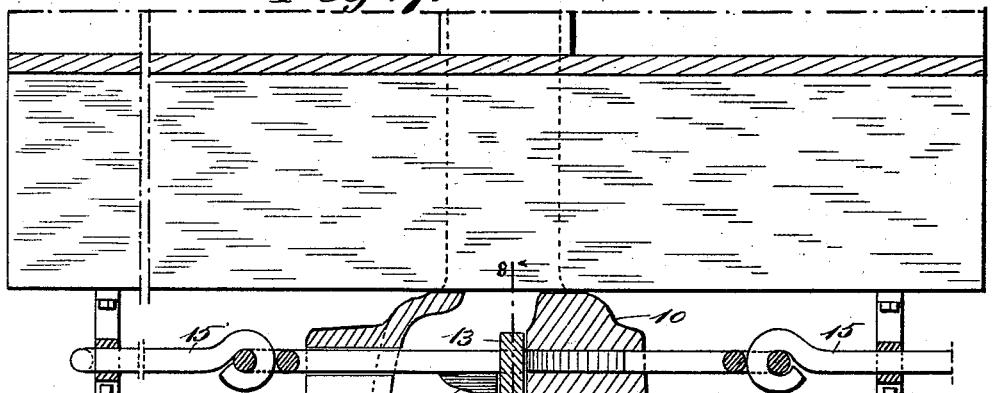
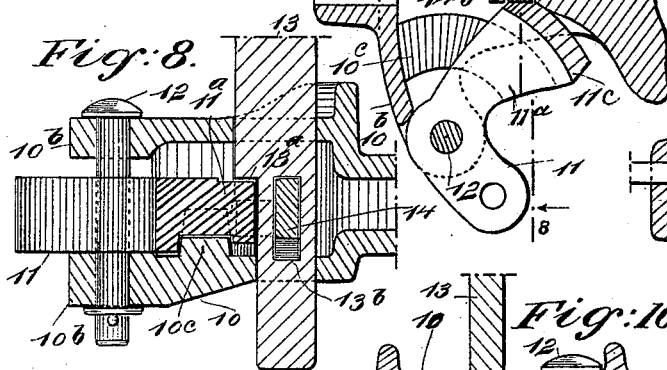
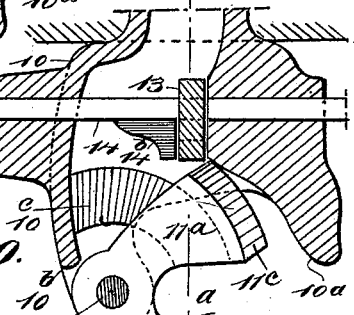

UNITED STATES PATENT OFFICE.

ALONZO C. PACKER, OF PITTSBURG, PENNSYLVANIA.

CAR-COUPLING.

SPECIFICATION forming part of Letters Patent No. 530,795, dated December 11, 1894.

Application filed July 13, 1894. Serial No. 517,459. (No model.)

*To all whom it may concern:*

Be it known that I, ALONZO C. PACKER, of Pittsburg, in the county of Allegheny and State of Pennsylvania, have invented a new and useful Improved Car-Coupling, of which the following is a full, clear, and exact description.

My invention relates to improvements in car couplings of the Janney type, and has for its object to provide a novel and superior device of the character indicated, which will be adapted for an automatic coupled engagement with another coupling of the same construction, and for a safe detachment of such couplings from either side of cars having the improvement in a coupled condition.

To these ends my invention consists in the construction and combination of parts, as is hereinafter described and claimed.

Reference is to be had to the accompanying drawings, forming a part of this specification, in which similar figures of reference indicate corresponding parts in all the views shown.

Figure 1 is a side view of the improved coupling in an uncoupled condition, on an end portion of a car. Fig. 1$^a$ is a side view of the front end of the coupling, showing the latch block in coupled adjustment. Fig. 2 is a plan view in part of a car end portion and the improvement on it shown in condition to interlock with a similar coupling. Fig. 3 is a sectional plan view of the improved coupling on a car in part, taken on the line 3—3 in Fig. 1. Fig. 4 is a detached side view of the locking key of the improved coupling. Fig. 4$^a$ is a transverse sectional view in part, of the locking key and an engaged lifting bar, that are parts of the improvements. Fig. 5 is a perspective view of the latch block that is a part of the improved coupling. Fig. 6 is a transverse sectional view of the improved coupling on the line 6—6 in Fig. 3. Fig. 7 is a sectional plan view of the improved devices, showing the parts adjusted to release the latch block and uncouple the car coupling. Fig. 8 is a longitudinal sectional view of the improvement, on the line 8—8 in Fig. 7. Fig. 9 is a sectional plan view of the front portion of the coupling showing its parts adjusted in a completely uncoupled condition; and Fig. 10 is a transverse sectional view of parts of the improved coupling, on the line 10—10 in Fig. 3, showing the rear end of the latch block in coupled adjustment.

The drawhead 10 is adapted at its rear end portion for connection in the usual way with a car frame, and may be spring-cushioned or otherwise supported as may be preferred, and as these features are of ordinary construction they are omitted from the drawings.

The head portion of the drawhead 10, is widened to give it suitable dimensions for service and is interiorly chambered to receive the latch block 11.

As usual there is a solid horn 10$^a$ formed on the front of the drawhead at one side, to serve as a guide for the introduction of the latch block of a similar coupling, and oppositely from the horn two spaced parallel jaws 10$^b$ are integrally formed on the drawhead, for the hinged support of the substantially L-shaped latch-block 11.

There is a pivot bolt 12 provided, to produce a jointed connection between the drawhead 10 and latch-block, these parts being perforated in alignment to receive the bolt, the perforation in the block 11 being formed at the junction of its two limbs, as clearly represented in the figures where the block appears in plan and perspective. It will be seen that there is a space afforded between the ears of the drawhead and the latch-block, so that the latter may play a limited degree on the pivot bolt, its weight causing it to normally rest on the lower ear of the drawhead.

To render the coupling efficient in use, there is an inclined plane 10$^c$ formed on the bottom wall of the chamber in the drawhead 10, which is curved in outline and slopes downwardly and outwardly from the highest point where said incline joins the side wall of the drawhead having the ears at the front of the same, as represented by full and dotted lines in Figs. 3, 7 and 9.

The tail-piece 11$^a$, on the latch-block 11 is thinner at the rear end than is the other limb of the said block—and at a proper distance from the rear curved edge of the tail-piece, the latter is grooved on the lower side on the arc of a circle having the axis of the pivot bolt 12 as a radial center, said groove 11$^b$ being sloped to correspond with the inclined plane on the drawhead bottom wall and so proportioned in breadth that the latch-block will freely engage the inclined plane mentioned.

It will be evident that when the latch-block 11 is adjusted so that its tail-piece is in the position indicated in Figs. 3 and 10, the block will have ridden up the inclined plane on the drawhead, so as to occupy a position with its upper face in loose contact with the lower side of the top ear on the drawhead, as represented in Fig. 1ª, and that if not restrained, the gravity of the block will cause it to partly rotate on its pivot bolt 12, and slide down the inclined plane so as to dispose the coupling limb of the latch-block in open adjustment, or in the position represented in Fig. 9.

The locking and releasing devices for the coupling latch-block are of novel construction, comprising parts that will now be described.

Near the transverse center and front edge of the drawhead 10, said part is vertically and rectangularly apertured through its top and bottom walls, for the reception of the loosely fitting locking key 13 that is parallel on the sides and similarly formed on its edges, the aperture being of greater width longitudinally considered than it is transversely, so that the key will at its upper portion have greater width than thickness. The locking key 13, has a square shoulder 13ª formed on its front edge at a point near its longitudinal center, by a reduction of its breadth from said point to the lower end, and the aperture in the lower wall of the drawhead is similarly reduced in dimensions, so that the key will be arrested when the shoulder 13ª impinges the lower wall of the drawhead. As shown in Figs. 1 and 6, the locking key 13, is of a greater length than the thickness of the drawhead, so that a proper reciprocatory movement of the key in the slot it occupies is permitted, and at the top of said key a perforation is formed for the attachment of a flexible connection or lifting rod thereto if this is desired.

There is a rectangular elongated piece 14 provided that is termed a lifting bar, said part being loosely inserted in a rectangular transverse slot that is formed in the drawhead to receive it, said slot being located at a point that will cause it to intersect the key-way or vertical aperture wherein the key 13 is located, the relative location of the transverse slot disposing the lifting bar nearer to the rear than the front edge of the locking key when these parts are in place.

To permit the lifting bar 14 to pass through the drawhead, a transverse rectangular orifice is formed in the locking key 13, as clearly shown at 13ᵇ, in Fig. 4, the lifting bar loosely engaging said orifice, that is wider than the bar, so that the locking key may be vertically reciprocated a limited degree when the lifting bar 14 is in place. On the bar 14 at a point intermediate of its ends and on its upper edge, a cam slope 14ª is formed of a correct length and depth, by removal of material from the edge of the bar, said sloped formation serving to gradually reduce the width of the bar, and at its lowest point terminates in an upright shoulder, as shown in Figs 4ª and 6.

It will be apparent that when the lifting bar 14, is adjusted to locate the locking key 13, at the lowest part of the cam sloped part of the edge of said bar, the key 13 will by its gravity be lowered a degree equal to the depth of the notch in the edge of the piece 14, and the shoulder 13ª will be depressed a corresponding degree; the longitudinal movement of the lifting bar in a proper direction so as to cause the key 13 to ride up the slope 14ª, elevating the key and consequently removing the shoulder on it from the lower wall of the drawhead, in an obvious manner.

The position of the lifting bar 14, is directly rearward of the curved rear edge on the tail-piece of the latch-block 11 as is clearly shown in Fig. 3, this occurring when the block is adjusted to dispose its locking limb partly across the front of the drawhead. It will be seen, that when the tail-piece 11ª is so disposed and the lifting bar 14 is slid to drop the locking key 13 to the bottom of the cam slope 14ª, said key will oppose the swinging movement of the cam block, or in other words will lock the block with its forward limb projected transversely of the front end of the drawhead, to lock it fast to a similar latch-block on a corresponding car coupling.

On the front of the lifting bar 14, at a proper distance from the cam slope 14ª on the same side of the drawhead with the latch-block 13, a pusher lug 14ᵇ is formed on or secured to said bar, which lug projects a proper degree from the bar and is adapted to reciprocate in the drawhead, by giving the slot occupied by the bar increased width in the side wall of the part 10 with which it has contact.

The tail-piece 11ª is sloped on the upper side at its rear terminal, which slope 11ᶜ is oppositely inclined from the pitch of the inclined plane 11ᵇ which is forward of it.

The lowest edge of the incline 11ᶜ is at the side of the tail-piece 11ª which is nearest to the pusher lug 14ᵇ in service, this incline having a greater breadth considered from rear to front than the width of the shoulder 13ª, so that the block 11, when swung from the position represented in Fig. 9, to that shown in Fig. 3, will freely engage its incline 11ᶜ with said shoulder and elevate the key 13, which will drop by its gravity and lock the latch-block in closed adjustment when the latter assumes the position indicated in Figs. 2 and 3.

By the construction of parts as described, a longitudinal movement of the lifting bar 14 in a direction that will cause the key 13 to ride up the cam slope 14ª, will release the tail-piece 11ª, as it will then be opposite the reduced portion of the locking key or below the shoulder 13ª on the latter.

A continuation of the sliding movement of the bar 14 in the direction mentioned will cause the pusher lug 14<sup>b</sup> to impinge the nearest edge of the tail block 11<sup>a</sup> and give it an impetus down the inclined plane of the drawhead, so that the single longitudinal movement of the bar 14, in a proper direction, will effect the complete release of the latch-block 11, that will then assume by its gravity the position indicated in Fig. 9, thus disposing the locking limb of said latch-block past the center line $a$, $a$ of the drawhead. The block will now be in a position to receive the impinge of a latch-block on a similar car coupling, for a latching engagement with the same, the inward swinging of the tail-piece 11<sup>a</sup> serving to lift the key 13, if previously dropped and slide the lifting bar, by reason of the impinge of said tail-piece on the lug 14<sup>b</sup>, so that the tail-piece may assume the position represented in Fig. 3, when the key 13 will be automatically depressed and the completion of the act of coupling effected.

The ends of the lifting bar 14, may be extended sufficiently to permit them to be manipulated from the sides of a car having the improvement. Preferably for convenience in manufacture, the bar is made short and has the extensions 15 provided that are arranged to slide on the end of the car, substantially as shown in Figs. 2, 6 and 7, said bar extensions that are loosely attached to the bar 14, having handles 15<sup>a</sup> that afford means for the safe and convenient sliding movement of the bar 14, and the manual release of two coupled couplings when this is desired.

Having thus fully described my invention, I claim as new and desire to secure by Letters Patent—

1. In a car coupling, the combination with a drawhead, and a pivoted latch block, of a vertically sliding key, and a lifting bar passing through the key and adapted to elevate said key and release the latch block, when longitudinally moved, substantially as described.

2. The combination, with a recessed drawhead vertically slotted, and transversely apertured to intersect said slot, of a pivoted latch block, a locking key shouldered on the front edge and working in the vertical slot, which key locks the latch block when depressed, a lifting bar passing through a lateral slot in the key and having a cam slope on its top edge that engages the upper edge of the key slot to elevate said key when the bar is moved, and means to move the bar, substantially as described.

3. The combination with a chambered drawhead, a pivoted latch-block adapted to slide around on an inclined plane in the drawhead chamber, and a vertically reciprocating locking key having an arresting shoulder, said key arranged to lock the tail-piece of the block when the shoulder is lowered, of a lifting bar working through transverse aligned slots in the drawhead and key and having a cam slope whereon the key may rest, and means to longitudinally move the bar from the sides of a car, substantially as described.

4. In a car coupling, the combination with a drawhead and a pivoted latch block, of a vertically movable key in the drawhead, and having its body reduced in width for a part of its length to produce an arresting shoulder forwardly thereon, and also transversely slotted near said shoulder, and a key lifting bar having a cam slope on its top edge and working through the slot in the vertical key to lift it, substantially as described.

5. In a car coupling, the key-lifting bar working through transverse aligned slots in the drawhead, and through a vertically sliding locking key, that when depressed locks the latch block in coupled condition, said bar having a cam slope on its upper edge that is adapted to raise the key, and further provided with a pusher lug at one side which outwardly rocks the latch-block after it is released, substantially as described.

ALONZO C. PACKER.

Witnesses:
JOHN SWINDELLS,
U. M. HOLZINGER.